3,322,743
MONOMER RECOVERY FROM CHLORATE/SULF-OXY CATALYZED SYSTEMS COMPRISING ADDING AN OXIDIZING AGENT AND ADJUSTING THE pH
Takashi Shibukawa and Akiyoshi Uchida, both of Saidaiji, Japan, assignors to American Cyanamid Company, Stamford, Conn., a corporation of Maine
No Drawing. Filed May 28, 1964, Ser. No. 371,084
Claims priority, application Japan, June 22, 1963, 38/33,248
6 Claims. (Cl. 260—88.7)

This invention relates to improvements in a method of recovering unreacted monomers from the aqueous polymeric slurry obtainable upon polymerization of acrylonitrile or co-polymerization of acrylonitrile with one or more vinyl monomers copolymerizable therewith in the presence of a chlorate ion-reducing sulfoxy ion polymerization catalyst.

In connection with the polymerization of acrylonitrile polymers in aqueous media, there have been proposed two methods for recovering unreacted monomers from the polymerization system, one of said methods comprising separating the polymer from the polymerization system by precipitation and filtration, and heating the filtrate to evaporate the unreatcted monomer, and the other method comprising heating the polymeric slurry or blowing steam into said slurry without preliminarily separating the polymer, thereby evaporating or distilling off the unreacted monomer. Since, in the former method, a large volume of diluted liquid, i.e, a combined volume of the filtrate obtainable after separation of the polymer and the effluent must be treated, the latter method is obviously more economical. The latter method, however, is not free from disadvantages, for the polymer also is heated so that it is likely to yellow or be degraded.

The present invention provides a method for recovering unreacted monomers, which comprises adding a substance capable of oxidizing reducing sulfoxy compounds and an alkaline substance to an aqueous polymeric slurry obtainable upon polymerization of acrylonitrile in the presence of a chlorate ion-reducing sulfoxy ion catalyst system, thereby inactivating the unreacted sulfoxy compound and adjusting said slurry to pH 4–6, and, finally, recovering the unreacted monomer. The invention accomplishes such objects as prevention of the degradation of the polymer and of the recovered monomer, prevention of further polymerization of the monomer, and prevention of bubbling that would arise in the course of recovery.

The compounds that are capable of yielding reducing sulfoxy ions include sulfur dioxide, sulfite, bisulfite, metabisulfite, hydrosulfite and thiosulfate.

In the polymerization reaction catalyzed by a chlorate ion-reducing sulfoxy ion system, the polymerization medium is preferably held below pH 3, for at any higher pH, there will be encountered abnormal rises in pH during the reaction, as well as the resultant increase in molecular weight and the corresponding reduction in the degree of polymerization. If this pH requirement is satisfied, the polymeric slurry obtainable upon completion of the reaction will lie in the neighborhood of pH 1.5 to 3. However, there is abundant literature indicating that since polyacrylonitrile and acrylonitrile copolymers contain nitrile groups, they would be converted to polyacrylic acid or polyacrylamide upon saponification if an acid or alkali were present. Furthermore, it is known that the presence of COOH or $CONH_2$ groups that may arise upon saponification not only variegates the yarn-making quality of the fiber, but also alters its dye-receptivity. It is, therefore, of vital importance from the standpoint of product stability and uniformity to prevent degradation of the polymer as much as practicable. Acrylonitrile and monomers copolymerizable therewith, i.e. methyl acrylate, etc., just as their polymers, are also saponified in the presence of acids or alkalies. For example, the degree of hydrolysis (reaction temperature: 45° C.; reaction time: 1.5 hours) of the monomer is as follows:

| pH: | Degree of hydrolysis of monomer |
| --- | --- |
| 1.5 | 9%. |
| 2 | 2%. |
| 3 | 1%. |
| 4–6 | No appreciable reaction. |
| 7–10 | 30%–60%. |

It will be apparent from the above tablet that, in order to prevent degradation of the polymer and, also, of the monomer in recovering the unreacted monomer from said polymeric slurry, it is necessary to adjust the slurry to pH 4–6.

Since substantial amounts of unreacted monomer and unreacted catalyst are contained in the polymeric slurry depending upon the degree of polymerization, it is necessary to inhibit the polymerization reaction by some means. If the reaction is not inhibited, the polymerization proceeds further to induce abnormal increases in molecular weight, branching, and other objectionable results so that the desired polymer cannot be manufactured. When the chlorate ion-sulfoxy ion redox catalyst of the present invention is employed, the polymeric slurry will contain $H_2SO_3$. We have found that the inactivation of this $H_2SO_3$ not only completely prevents the polymerization in the recovery column which has heretofore induced troubles in the recovery of the monomer, but also prevents the bubbling within the recovery column which would make it impossible to recover the monomer. The prevention of bubbling is particularly important when a sulfoxy ion donor compound is used in excess of a chlorate ion donor compound.

Removal of $H_2SO_3$, i.e. its inactivation, is effected by adding a member of the group consisting of various oxidizing agents capable of reacting with $H_2SO_3$ such as hydrogen peroxide, permanganate, bichromate, and chlorate. Thus, in acidic water, $Na_2SO_3$ exists in the form of $H_2SO_3$, but, upon addition of such an oxidizing agent, it is converted to $H_2SO_4$, ceasing to exist in the form of $H_2SO_3$.

While the inactivation of $H_2SO_3$ inhibits the polymerization reaction, and prevents the polymerization and bubbling in the recovery column, the addition of such an oxidizing agent is not sufficient to control the pH of the system. Conversely, due to the $H_2SO_4$ to be formed upon addition of such an oxidizing agent, the pH is lowered, the result being undesirable in view of preventing degradation of the polymer and of the monomer. In accordance with the present invention, therefore, the addition of said oxidizing agent should be accompanied by the addition of an alkaline substance such as alkali peroxide, $NH_4OH$, $NaOH$, $Na_2CO_3$, $K_2CO_3$ and $NaHCO_3$.

If the sole object is to control the pH of the slurry, it may be accomplished merely by adding an alkaline substance, e.g. $NH_4OH$, $NaOH$, $KOH$, $Na_2CO_3$, $K_2CO_3$, $NaHCO_3$, etc., to the polymeric slurry. However, it has been found that, unless $H_2SO_3$ is removed, the unreacted monomer cannot be recovered, for β-sulfopropionitrile or β-sulfopropionate, which is the addition product between $H_2SO_3$ and unreacted acrylonitrile or methacrylate, is formed as the slurry gains in pH, particularly at pH of 3 or higher. This addition reaction may be represented as follows:

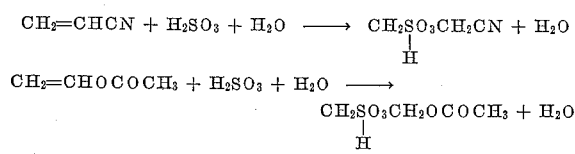

Thus, it is necessary to remove $H_2SO_3$ before the slurry is adjusted to pH 4–6 with an alkaline substance.

To sum up, the present invention is characterized by adding an alkaline substance along with an oxidizing agent so as to remove $H_2SO_3$ and adjust the slurry to pH 4–6, whereby the degradation of the polymer and of the monomer to be recovered, the post-polymerization after completion of the polymerization, the bubbling in the recovery column, and the formation of by-products from the interaction between the unreacted monomer and $H_2SO_3$ are all prevented efficiently in one operation.

The present invention will be better understood when reference is had to the following examples.

*Example 1*

A monomer mixture of 90% acrylonitrile and 10% methacrylate was polymerized in an aqueous solution of nitric acid with the aid of $NaClO_3$—$Na_2SO_3$ redox catalyst (using an excess of $Na_2SO_3$). Upon analysis of the resulting slurry (pH 2.7), it was found that the residual $H_2SO_3$ was 0.57%.

To the above slurry was added a varying molar ratio of $H_2O_2$ with respect to the residual $H_2SO_3$ as shown in the following table, which also shows, besides the relative amounts of $H_2O_2$ added, the precentages of residual $H_2SO_3$ and the pH values subsequent to said addition.

| $H_2O_2$ Added/ Residual $H_2SO_3$ (Molar Ratio) | pH Slurry | pH After Addition of $H_2O_2$ | Percentages of Residual $H_2SO_3$[a] |
|---|---|---|---|
| (1)  1/1     | 2.7 | 1.4 | 0 |
| (2)  0.9/1   | 2.7 | 1.4 | 2.2 |
| (3)  0.85/1  | 2.7 | 1.5 | 6.6 |
| (4)  0.7/1   | 2.7 | 1.6 | 17.5 |
| (5)  0.5/1   | 2.7 | 1.8 | 34.2 |

[a] $\frac{H_2SO_3 \text{ After Addition}}{H_2SO_3 \text{ Before Addition}} \times 100$.

Addition of $H_2O_2$ immediately inhibited the polymerization reaction, and there were observed no further increases in molecular weight and in the degree of polymerization, but the pH of the slurry was lowered.

The unreacted monomers were recovered from the slurry (1) of the above table and from a slurry which had been adjusted to pH 4–6 with 5.1–5.4 cc. of 1 N $NH_4OH$, by blowing steam into said slurries for distillation. The measured amounts of carboxylic acid and the degrees of hydrolysis of the monomers and in the resulting polymers are shown below.

|  | Slurry, pH 1.4 (No $NH_4OH$), percent | Slurry, pH 4–6 ($NH_4OH$ Added), percent |
|---|---|---|
| Carboxylic acid in polymer | 0.34 | 0.25 |
| Degree of hydrolysis of monomers | 9 | 0 |

NOTE.—The amounts of carboxylic acid in the polymers were measured by conductometric titration of dimethylformamide solutions.

It will be apparent that, in the case of the sample which had been adjusted to pH 4–6, there was observed no increase in the amount of carboxylic acid, nor were the monomers hydrolyzed. Furthermore, the unreacted monomers could be successfully recovered without involving further polymerization and bubbling in the recovery column.

*Example 2*

A monomeric mixture of 90% acrylonitrile and 10% methyl acrylate was polymerized in an aqueous solution of nitric acid with the aid of $NaClO_3$—$Na_2SO_3$ redox catalyst. Upon analysis of the resulting slurry (pH 2.7), it was found that the residual $H_2SO_3$ was 0.55%.

(1) To the above slurry was added an equivalent mole of $Na_2O_2$ with respect to $H_2SO_3$. It was expected that the following reaction would yield a neutral slurry:

$$H_2SO_3 + Na_2O_2 + H_2O \rightarrow 2NaOH + H_2SO_4$$

Actually, although the residual $H_2SO_3$ was readily removed, the final slurry had a considerably high pH value (pH 12). It is due, likely, to the fact that, before the residual $H_2SO_3$ was oxidized, it formed an addition compound with the unreacted monomer as the pH of the system increased, thereby leaving an excess of $Na_2O_2$.

(2) On the other hand, the slurry to which 0.6 mole of $H_2O_2$ plus 0.5 mole of $Na_2O_2$ was added per mole of $H_2SO_3$ had no residual $H_2SO_3$, showing a pH of 4.5. The monomers were recovered from slurries 1 and 2 by blowing in steam. Analysis of the resulting polymer and of the recovered monomers gave the following results:

|  | Slurry, pH 12, percent | Slurry, pH 4.5, percent |
|---|---|---|
| Carboxylic acid in polymer | 0.48 | 0.26 |
| Degree of hydrolysis of monomers | 80 | 0 |

*Example 3*

A monomeric mixture of 90% acrylonitrile and 10% methyl acrylate was polymerized in an aqueous solution of nitric acid with the aid of $NaClO_3$—$Na_2SO_3$ redox catalyst (using an excess of $Na_2SO_3$). Upon analysis of the resulting slurry, it was found that the residual $H_2SO_3$ was 0.56%.

To the above slurry was added 1 mole of $K_2Cr_2O_7$ for each 3 moles of the residual $H_2SO_3$. It was found that the residual $H_2SO_3$ was 0%, with the pH being 1.4. After the slurry was adjusted to pH 5 with 1 N NaOH, the monomers were recovered by blowing steam into the slurry. After said recovery, the polymer contained 0.25% of carboxylic acid, with the degree of hydrolysis of the monomers being 0%.

We claim:

1. In a method of recovering monomeric material comprising acrylonitrile from aqueous slurries obtained upon polymerization of such monomeric material in the presence of a chlorate ion-reducing sulfoxy ion catalyst system; the improvement comprising oxidizing the reducing sulfoxy compound and adjusting the pH of the slurry to between 4 and 6 prior to recovering the monomers.

2. In a method of recovering monomeric material comprising acrylonitrile from aqueous slurries obtained upon polymerization of such monomeric material in the presence of a chlorate ion-reducing sulfoxy ion catalyst system which includes an evaporation step; the improvement comprising oxidizing the reducing sulfoxy compound and adjusting the pH of the slurry to between 4 and 6 prior to evaporation of such monomers for recovery from aqueous solution thereof.

3. In the process as defined in claim 1, the improvement further comprising performing the oxidation by addition of an oxidizing agent to the aqueous slurry at least as early as performing the adjustment of the pH to between 4 and 6 by addition of an alkaline substance.

4. In the process as defined in claim 1, the improvement further comprising performing the oxidation by addition of an said oxidizing agent capable of reacting with $H_2SO_3$ to the aqueous slurry at least as early as performing the said adjustment of the pH to between 4 and 6 by addition of an alkaline substance.

5. A process for recovering monomeric material comprising acrylonitrile from aqueous slurries obtained upon polymerization of such monomeric material in the presence of a chlorate ion-reducing sulfoxy ion catalyst system comprising:
  (a) oxidizing the reducing sulfoxy compound,
  (b) adjusting the pH of the slurry to between 4 and 6, and
  (c) steam distilling the thus treated slurry.

6. A process for recovering monomeric material comprising acrylonitrile from aqueous slurries obtained upon polymerization of such monomeric material in the presence of a chlorate ion-reducing sulfoxy ion catalyst system comprising:
  (a) oxidizing the reducing sulfoxy compound with an oxidizing agent capable of reacting with $H_2SO_3$,
  (b) adjusting the pH of the slurry to between 4 and 6 by addition of an alkaline substance, and
  (c) steam distilling the thus treated slurry.

References Cited

UNITED STATES PATENTS

| | | | |
|---|---|---|---|
| 2,731,401 | 1/1956 | Karnes et al. | 202—46 |
| 3,192,189 | 6/1965 | Nakajima et al. | 260—85.5 |

JOSEPH L. SCHOFER, *Primary Examiner.*

HARRY WONG, *Assistant Examiner.*